R. F. COLLINS.
MODE OF MANUFACTURING PRESSED STEEL CASES FOR FRICTION CLUTCHES.
APPLICATION FILED MAR. 22, 1909.

990,340.

Patented Apr. 25, 1911.

2 SHEETS—SHEET 1.

Attest:

Ewd L. Tolson
Bent. M. Stahl

Inventor:
Robert F. Collins,
By Spear, Middleton, Donaldson & Spear
Attys.

R. F. COLLINS.
MODE OF MANUFACTURING PRESSED STEEL CASES FOR FRICTION CLUTCHES.
APPLICATION FILED MAR. 22, 1909.
990,340.
Patented Apr. 25, 1911.
2 SHEETS—SHEET 2.
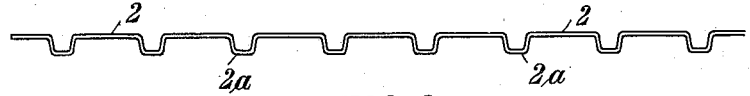
FIG. 3.
FIG. 4.
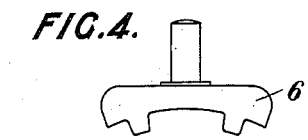
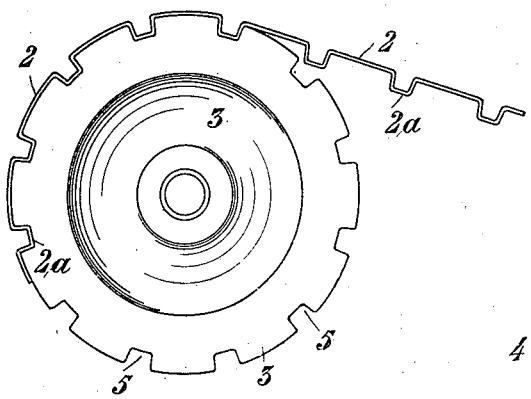
FIG. 5.
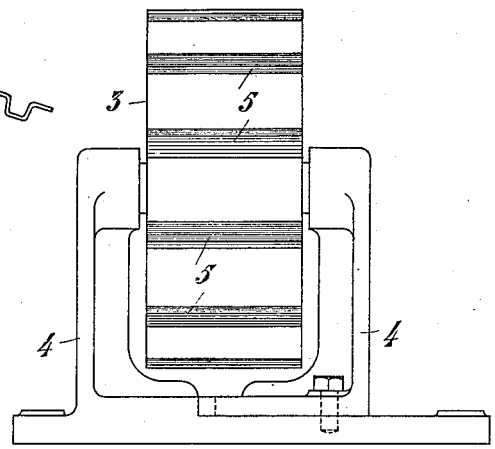
FIG. 6.
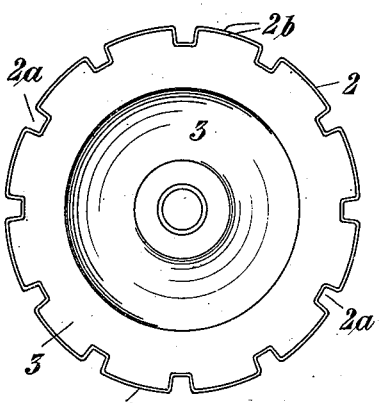
FIG. 7.
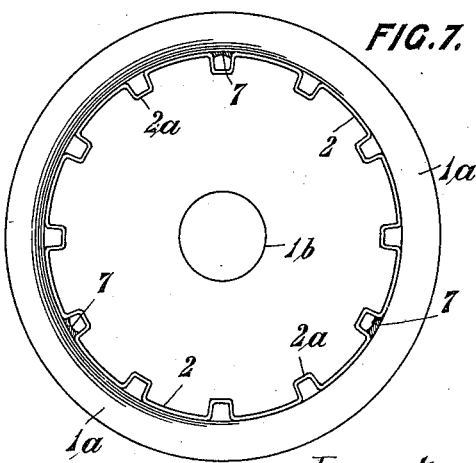
Attest:
Edwd L. Folson
Bent M. Stahl
Inventor:
Robert F. Collins
By Spear, Middleton, Donaldson & Spear
Attys.

UNITED STATES PATENT OFFICE.

ROBERT FREDERICK COLLINS, OF PARIS, FRANCE.

MODE OF MANUFACTURING PRESSED-STEEL CASES FOR FRICTION-CLUTCHES.

990,340.

Specification of Letters Patent.   Patented Apr. 25, 1911.

Application filed March 22, 1909.   Serial No. 485,097.

*To all whom it may concern:*

Be it known that I, ROBERT FREDERICK COLLINS, a subject of the King of Great Britain, and residing in Paris, France, at present temporarily residing in Liverpool, in the county of Lancaster, England, have invented a certain Improved Mode of Manufacturing Pressed-Steel Cases for Friction-Clutches, of which the following is a specification.

This invention relates to pressed steel cases for friction clutches, and is particularly applicable to the now well known "Hele-Shaw" corrugated disk type of clutch. Such a clutch consists, in the main, of a core attached to the one shaft, having on its external periphery a number of teeth, and an inclosing case attached to the other shaft, and having on its internal periphery a number of teeth, and two sets of engaging disks, one set engaging with the teeth on the core and the other set engaging with the teeth of the case. The case incloses the core, the two sets of plates, and the presser plate for producing pressure between the plates, and forms a fluid tight case therefor.

It is desirable to reduce the weight of the case to the lowest possible limits, and it is necessary that the teeth on its internal periphery should be absolutely parallel with the axis of the clutch and should be pitched to a standard corresponding with the teeth in the plates that engage therewith.

The present invention relates to the method of manufacturing cases of pressed steel comprising an external shell provided with a suitable flange within which is fixed a liner on which the teeth are formed.

I have illustrated my invention in the accompanying drawings, in which—

Figure 1:
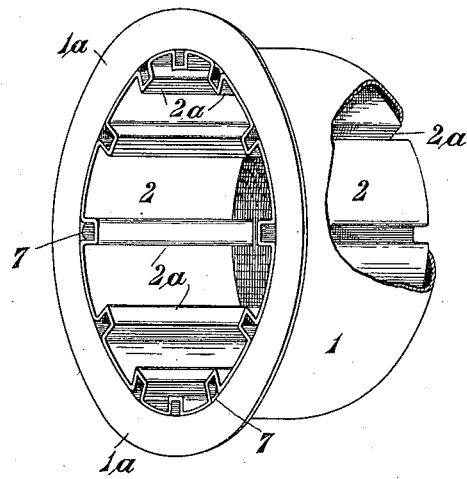
Figure 2:
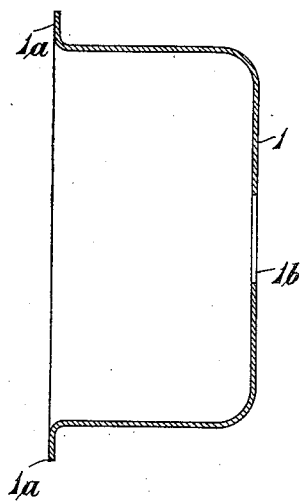

Figure 1 represents the completed case with its inner toothed liner; Fig. 2 shows the steel case prior to the liner being fitted therein; Fig. 3 shows the steel liner corrugated, but prior to its being bent to shape; Figs. 4 and 5 show the machine for bending the liner into circular form; Fig. 6 shows the liner in position on the toothed former, and Fig. 7 shows the liner on the former within the case, ready for the process by which the liner is attached to the case.

The process of manufacture is as follows;—A sheet of steel of suitable diameter, and of thickness varying, say, from two to three millimeters, according to the size of case required, is placed in a draw press of the usual type, and pressed by suitable dies into a shape substantially similar to that shown at 1 in Fig. 2, the flange 1ª being adapted to take the plate which closes in the end of the clutch, and an opening 1ᵇ subsequently cut in the end of the case, being adapted to take the central boss of the clutch through which the actuating part of the presser plate passes.

The liner 2 is formed from a strip of steel of width corresponding with the case, and is corrugated so as to form teeth 2ª of standard size and pitch. This strip is cut into such lengths that when notched and curved to shape as hereinafter described, the resulting liner has a circumference slightly greater than the circumference of the inner periphery of the case 1. The strips so cut are then placed in a machine, shown in Figs. 4 and 5, comprising a rotatable former 3, carried in a suitable frame 4, in which it is adapted to rotate, and having its periphery notched, as at 5, to correspond exactly with the shape and pitch of the teeth of the liner. The diameter of this former is such that when the strips are wound on it as shown in Figs. 4 and 5, the resulting curved strip is a very tight fit in the case. A reciprocating tool 6 is employed to force the teeth of the strip home into the notches 5, as the former 3 is rotated. When the length of strip has been wound on the former 3, the latter is removed from its spindle, and from the frame 4, and the abutting ends 2ᵇ of the liner are welded or brazed together on the former 3; the fact that the welding or brazing of the abutting ends of the liner is effected while the liner is in proper position on the former 3, insures a uniformity of circumference of the liner, and proper alinement of the notches. The former 3, with the liner in position on it, is then forced by a suitable press using considerable pressure, into position in the case, as shown in Fig. 7.

The liner has a very considerable frictional grip in the case, but it is further secured in position by being fuse-welded to the case at the points 7, the position and number of these points being selected in accordance with the work for which the clutch is designed; by the term fuse welding is meant the mode of welding which is effected by raising the temperature of the case and liner locally at points such as 7 to a welding heat, either by the passage therethrough of an electric current (as in the well known electrical welding apparatus), or by other means for applying heat locally, the liner and case being meanwhile forced into intimate contact by pressure at the said points. The welding between the liner and case is effected while the liner is still in position on the former 3, after being forced, in proper position on the former, into the case, the former 3 thus serving to hold the liner and case against distortion while it is being forced into the case and during welding. The case with the liner in position, and the former, are now placed so that the flange of the case rests on a hollow bolster, and an axial hole is drilled in the center of the end of the case, through which a punch operated by a press passes, the said punch serving to push the former out of the case, thus leaving the liner in position with its teeth parallel to the axis, properly pitched and securely fixed in position.

Having now fully described my invention, I declare that what I claim, and desire to secure by Letters Patent is:—

1. The herein described method consisting in placing a strip of steel on a toothed former and causing the strip to conform to the circumference of the former, uniting the abutting edges of the strip while on the former, then forcing the former with the strip thereon into a case, then fuse-welding the strip to the case, and finally removing the former.

2. The improved method of manufacturing clutch cases which consists in forming a plain flanged case of pressed steel; then corrugating a strip of steel to form a toothed liner; then bending the strip to circular shape on a toothed former; then uniting the abutting edges of the strip while on the former; then forcing the former with the strip in position thereon into the case; then fuse-welding the liner to the case; the former serving to exactly locate the liner in position in the case and to prevent any distortion of the case or liner during the process of welding; then drilling a hole in the end of the case, and finally removing the former, substantially as described.

In testimony whereof I have hereunto set my hand in the presence of two subscribing witnesses.

ROBERT FREDERICK COLLINS.

Witnesses:
J. E. LLOYD BARNES,
JOSEPH E. HIRST.